US011402642B2

(12) United States Patent
Stellman et al.

(10) Patent No.: US 11,402,642 B2
(45) Date of Patent: Aug. 2, 2022

(54) HEAD-MOUNTED DISPLAY ASSEMBLIES AND RELATED METHODS FOR INTERPUPILLARY DISTANCE ADJUSTMENTS

(71) Applicant: Facebook Technologies, LLC, Menlo Park, CA (US)

(72) Inventors: Jeffrey Taylor Stellman, Seattle, WA (US); Nirav Rajendra Patel, San Francisco, CA (US); Samuel Redmond D'Amico, San Francisco, CA (US); Wei Rong, San Jose, CA (US); Evan Lawrence Coons, Bellevue, WA (US); Joseph Patrick Sullivan, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 1 day.

(21) Appl. No.: 17/075,028

(22) Filed: Oct. 20, 2020

(65) Prior Publication Data

US 2021/0132397 A1 May 6, 2021

Related U.S. Application Data

(60) Provisional application No. 63/007,586, filed on Apr. 9, 2020, provisional application No. 62/929,932, filed on Nov. 3, 2019.

(51) Int. Cl.
*G02B 27/01* (2006.01)
*G02B 27/00* (2006.01)

(52) U.S. Cl.
CPC ..... *G02B 27/0176* (2013.01); *G02B 27/0093* (2013.01); *G02B 27/0172* (2013.01); *G02B 2027/0187* (2013.01)

(58) Field of Classification Search
CPC ............ G02B 27/0093; G02B 27/0172; G02B 27/0176; G02B 2027/0134; G02B 2027/0181; G02B 2027/0187
See application file for complete search history.

(56) References Cited

U.S. PATENT DOCUMENTS

| | | |
|---|---|---|
| 2009/0303315 A1 | 12/2009 | Charlesworth |
| 2016/0334628 A1 | 11/2016 | Lyons |
| 2017/0094816 A1* | 3/2017 | Yun .......................... H05K 5/03 |

OTHER PUBLICATIONS

International Search Report and Written Opinion received for PCT Application Serial No. PCT/US2020/057800 dated Feb. 3, 2021, 11 pages.

(Continued)

*Primary Examiner* — Nelson M Rosario
(74) *Attorney, Agent, or Firm* — FisherBroyles, LLP

(57) ABSTRACT

The disclosed head-mounted display assemblies may include a first eyecup and a second eyecup that are configured for respectively positioning a first lens and a second lens in front of intended locations of a user's eyes when the head-mounted display assembly is donned. The first eyecup and the second eyecup may be movable relative to each other to adjust for an interpupillary distance of the user's eyes. A single near-eye display screen may be configured for displaying an image to the user through the first and second eyecups. An enclosure over the single near-eye display screen may include a first transparent component positioned between the first lens and the single near-eye display screen and a second transparent component positioned between the second lens and the single near-eye display screen. Various other methods, devices, systems, and assemblies are also disclosed.

19 Claims, 13 Drawing Sheets

(56) References Cited

OTHER PUBLICATIONS

International Preliminary Report on Patentability for International Application No. PCT/US2020/057800, dated May 12, 2022, 10 pages.

* cited by examiner

1000

```
Hermetically seal a first transparent component and a second
transparent component over a single near-eye display screen to
form an enclosure
1010
            │
            ▼
Slidably position a first eyecup supporting a first lens
over the first transparent component
1020
            │
            ▼
Slidably position a second eyecup supporting a second lens
over the second transparent component
1030
```

```
┌─────────────────────────────────────────────────────────────┐
│   Move a first eyecup over a first transparent component that is │
│   positioned over a single near-eye display screen          │
│                        1110                                 │
└─────────────────────────────────────────────────────────────┘
                              │
                              ▼
┌─────────────────────────────────────────────────────────────┐
│ Move a second eyecup over a second transparent component that │
│  is positioned over the single near-eye display screen, wherein the │
│ single near-eye display screen, the first transparent component, and │
│  the second transparent component define a hermetically sealed │
│                        enclosure                            │
│                          1120                               │
└─────────────────────────────────────────────────────────────┘
```

*FIG. 11*

HEAD-MOUNTED DISPLAY ASSEMBLIES AND RELATED METHODS FOR INTERPUPILLARY DISTANCE ADJUSTMENTS

CROSS-REFERENCE TO RELATED APPLICATION

This application claims the benefit of U.S. Provisional Patent Application Ser. No. 63/007,586, titled "HEAD-MOUNTED DISPLAY ASSEMBLIES AND RELATED METHODS FOR INTERPUPILLARY DISTANCE ADJUSTMENTS," filed 9 Apr. 2020, and U.S. Provisional Patent Application Ser. No. 62/929,932, titled "HEAD-MOUNTED DISPLAY ASSEMBLIES AND RELATED METHODS FOR INTERPUPILLARY DISTANCE ADJUSTMENTS," filed 3 Nov. 2019, the entire disclosure of each of which is incorporated herein by reference.

BRIEF DESCRIPTION OF THE DRAWINGS

The accompanying drawings illustrate a number of example embodiments and are a part of the specification. Together with the following description, these drawings demonstrate and explain various principles of the present disclosure.

FIG. 11 is a flow diagram illustrating a method of adjusting an interpupillary distance of a head-mounted display assembly, according to at least one embodiment of the present disclosure.

Figure 1A:
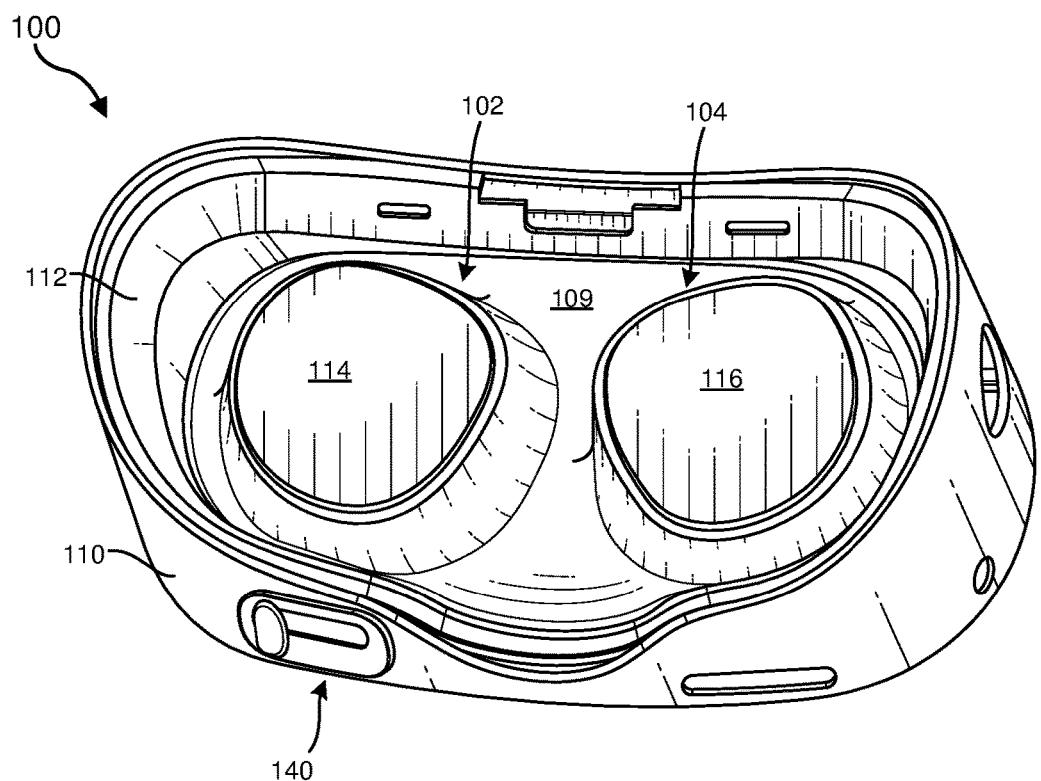
FIG. 1A is a perspective view and FIG. 1B is a cross-sectional side view of a head-mounted display assembly, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

Artificial-reality systems, such as virtual-reality systems or augmented-reality systems, typically display computer-generated content to users in order to create immersive experiences. The content may be displayed on a head-mounted display ("HMD") screen. For example, a virtual-reality system may create three-dimensional renderings to simulate an environment or a virtual space. Alternatively, augmented-reality systems may merge computer-generated content with a user's view of a real-world environment to enhance interactions with the real-world environment. These systems may provide users with the ability to navigate and alter digital content that may provide helpful information about real-world objects. HMD systems sometimes include two optical lenses—one for each eye—positioned in front of the screen. The lenses may magnify and/or provide an appropriate focus to images displayed on the screen. Contamination (e.g., dust particles, fingerprints, etc.) on the lenses or the screen can undesirably block or otherwise obscure portions of a displayed image. Moving parts in HMD systems can sometimes produce or move contamination in front of the displayed image.

Different users have different head and face shapes and sizes. For example, a particular user's eyes may be located closer or farther apart from each other, compared to other users. The distance between the center of an HMD user's pupils is commonly referred to as "interpupillary distance" or "IPD." Positioning the lenses to match a particular user's IPD improves picture quality for that user. To accommodate different IPDs, some HMDs include a mechanism to adjust an IPD setting and, therefore, a relative position between the optical lenses. Some HMDs include two separate screens coupled to the two respective lenses. Each lens and screen pair may be movable relative to the other lens and screen pair to adjust for IPD. Each lens and screen pair may include a sealed interior to inhibit the introduction of contamination, to improve or maintain picture quality. However, two such screens are generally more expensive to integrate into HMDs compared to a single screen. However, conventional HMD systems with one screen and IPD adjustment capability generally have a configuration that may allow contamination to be introduced onto the screen and/or onto a screen side of the lenses.

The present disclosure is generally directed to HMD assemblies that may include a single near-eye display ("NED") screen and two eyecups that are movable relative to each other to adjust for IPDs of different users. An enclosure may be disposed over the single NED screen. The enclosure may include a first transparent component positioned between the first lens and the single NED screen and a second transparent component positioned between the second lens and the single NED screen.

The enclosure, including the first and second transparent components, may provide a clean volume over the single NED screen to reduce contamination on the screen while also allowing for interpupillary adjustments. As will be explained in greater detail below, embodiments of the present disclosure may enable IPD adjustments over a single, sealed display screen. The single display screen may reduce a cost of HMD assemblies with IPD adjustability, compared to conventional HMD assemblies with two separate display screens. Additionally, the enclosure over the single NED screen may facilitate keeping the screen clean and substantially free from contamination, which might otherwise obstruct a user's view of blocked pixels of the display screen. Contamination (e.g., dust, particles, other debris) that may be present between the first and second lenses and the respective first and second transparent components may be substantially out-of-focus. The out-of-focus contamination, if sufficiently small, may be essentially invisible to the user. Even larger contamination may be less visible than if the contamination were positioned at the NED screen surface.

In some examples, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least 90% met, at least 95% met, or even at least 99% met.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
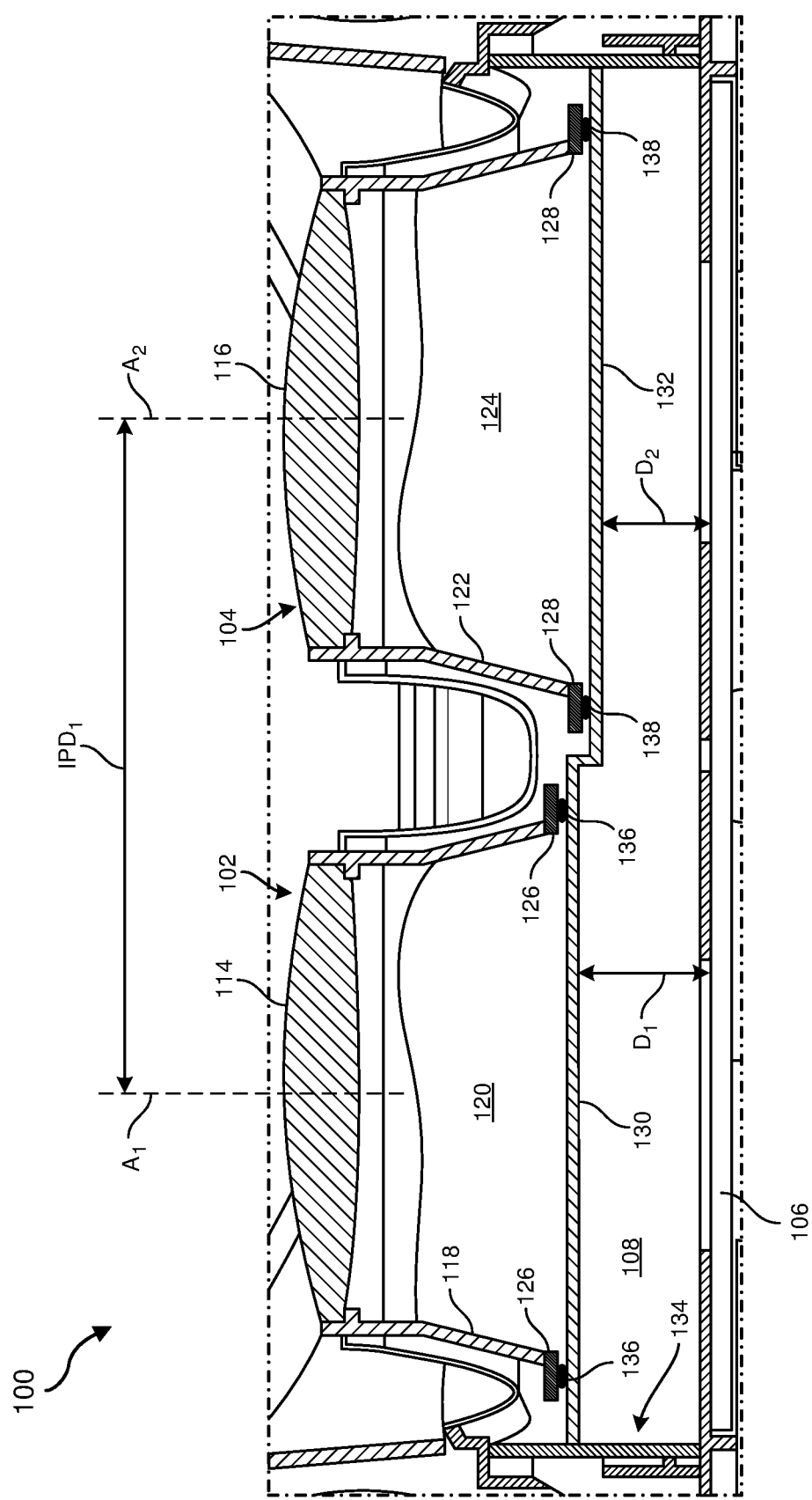
FIG. 2 is a detailed cross-sectional side view of the head-mounted display assembly of FIG. 1 with optical lenses at a first IPD setting, according to at least one additional embodiment of the present disclosure.
Figure 3:
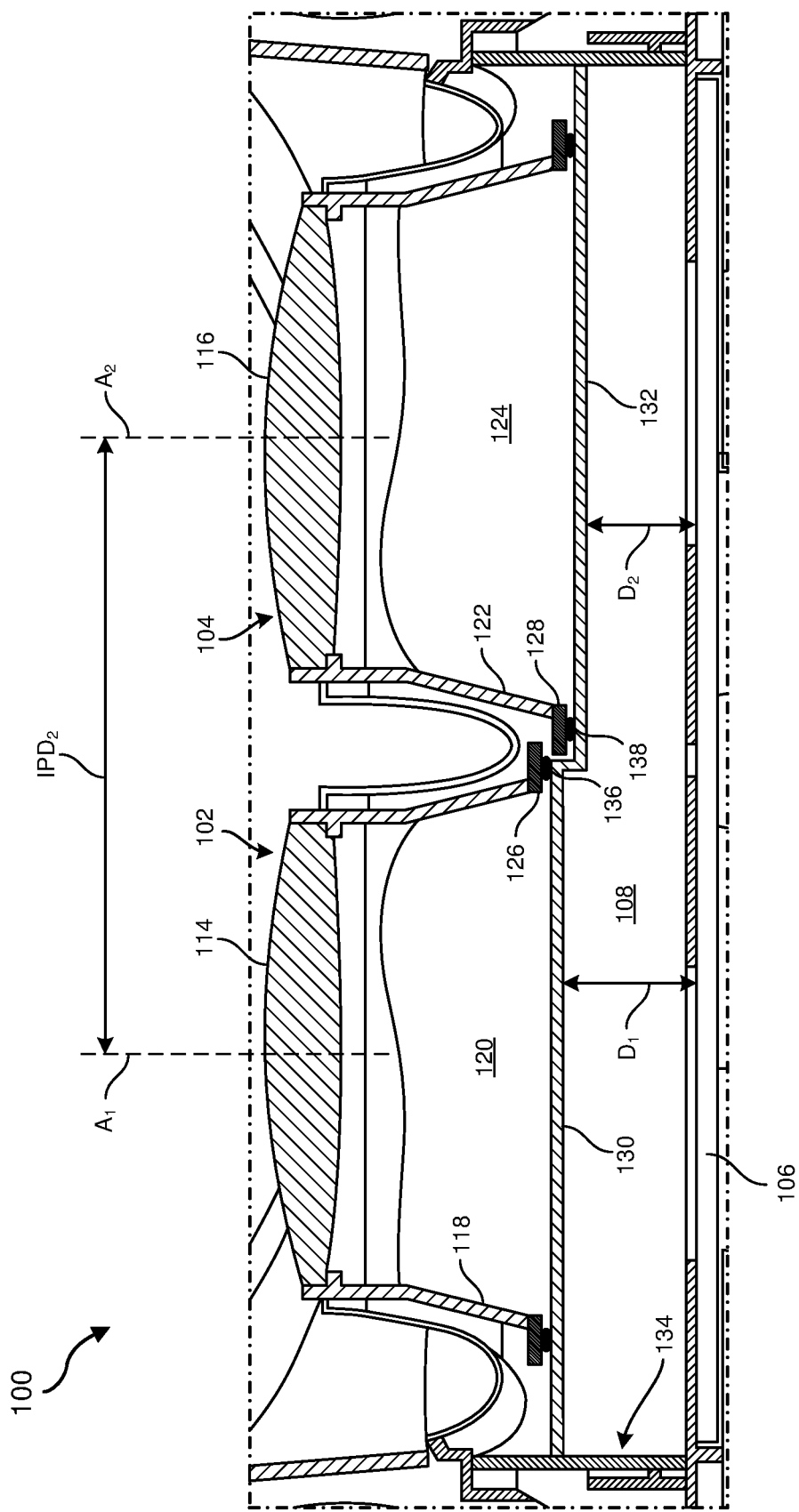
FIG. 3 is a detailed cross-sectional side view of the head-mounted display assembly of FIG. 1 with the optical lenses at a second IPD setting, according to at least one embodiment of the present disclosure.
Figure 4A:
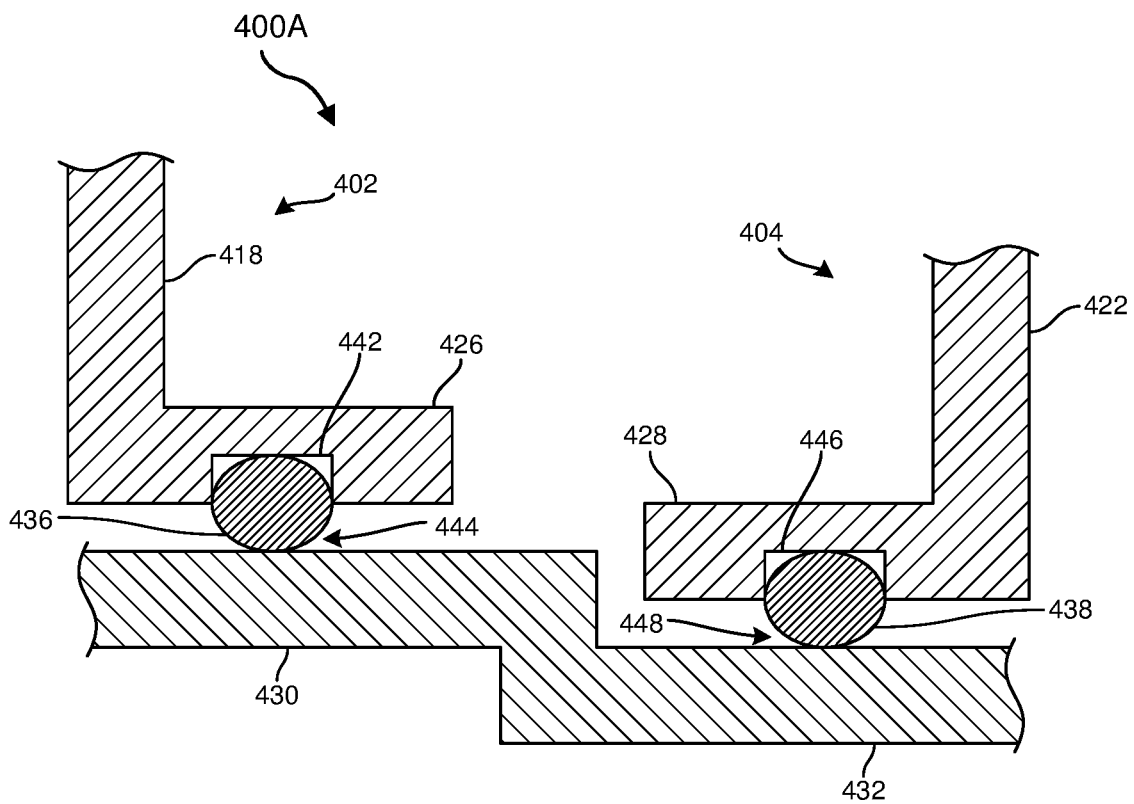
FIGS. 4A and 4B are detailed cross-sectional views of portions of head-mounted display assemblies, according to at least some embodiments of the present disclosure.
Figure 4B:
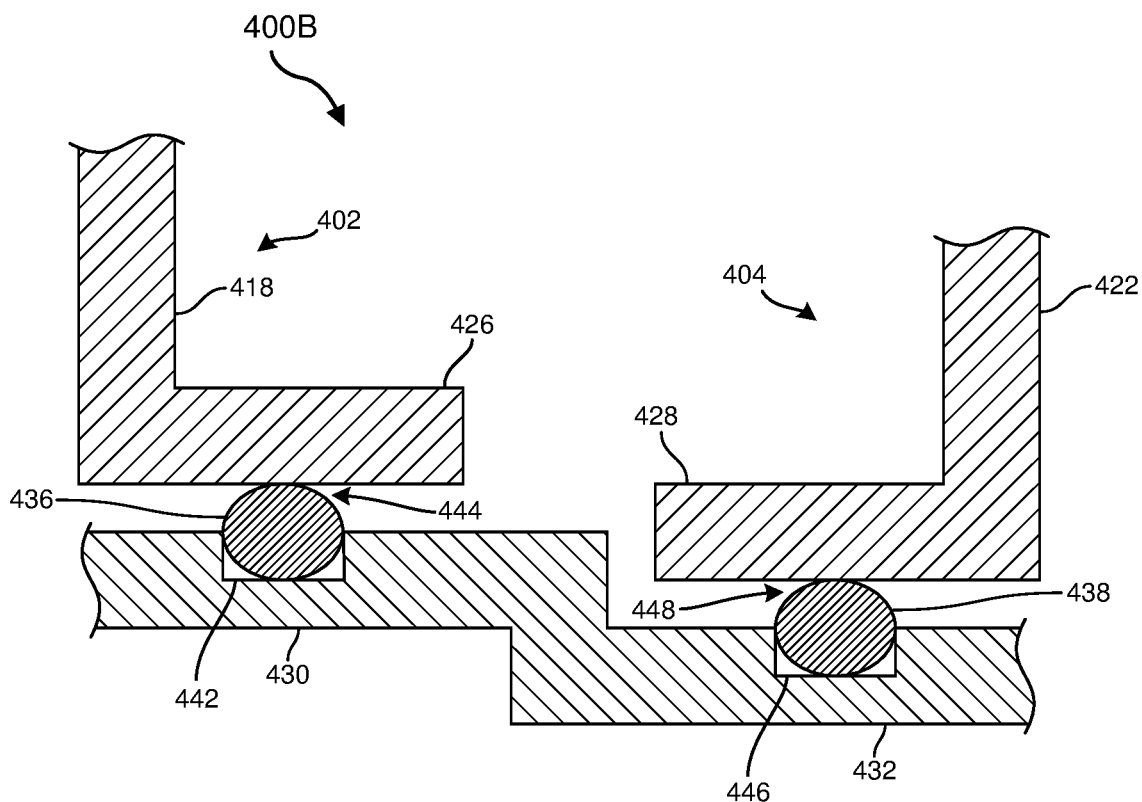
Figure 5:
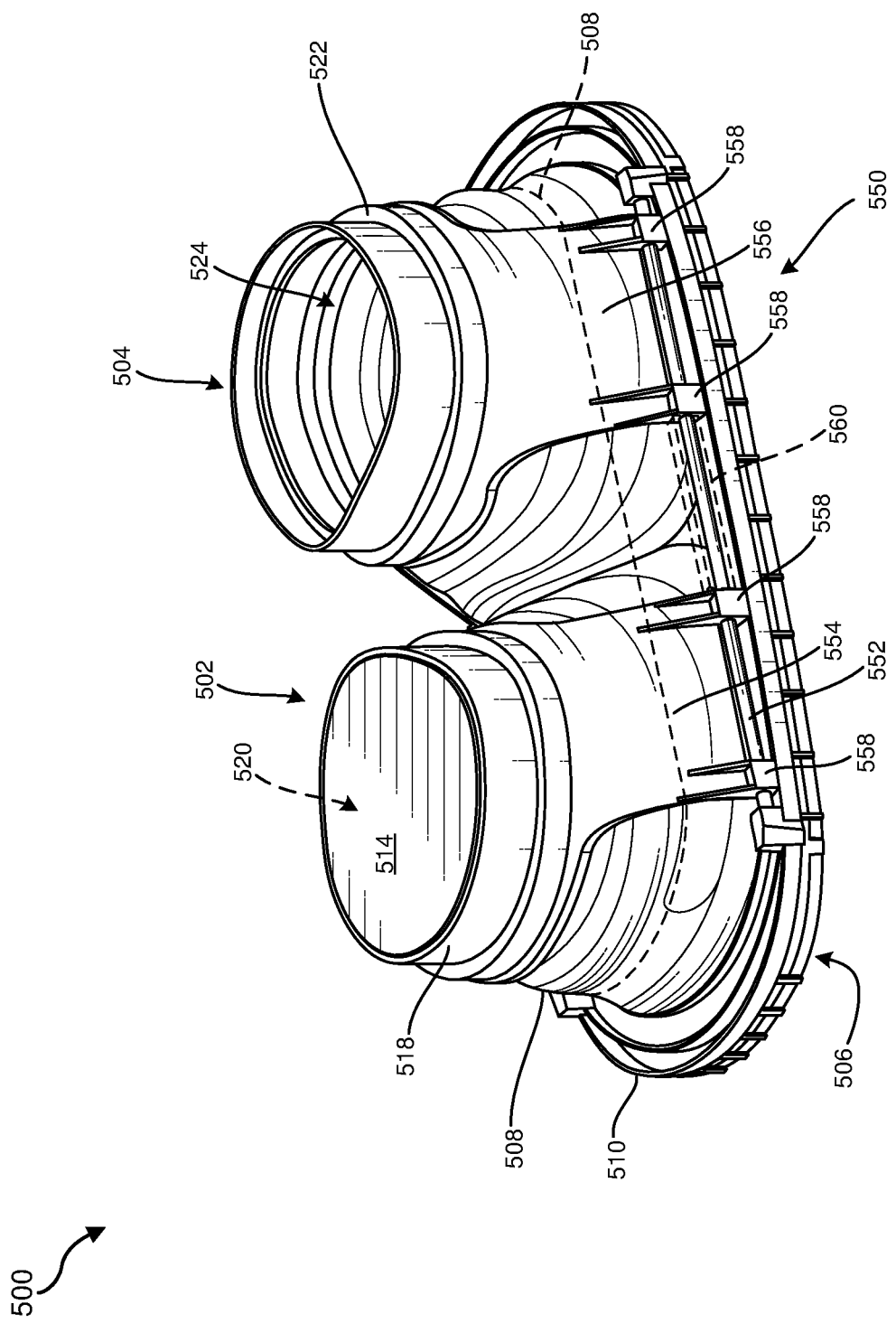
FIG. 5 is a perspective view of a head-mounted display assembly, according to at least one embodiment of the present disclosure.
Figure 8:
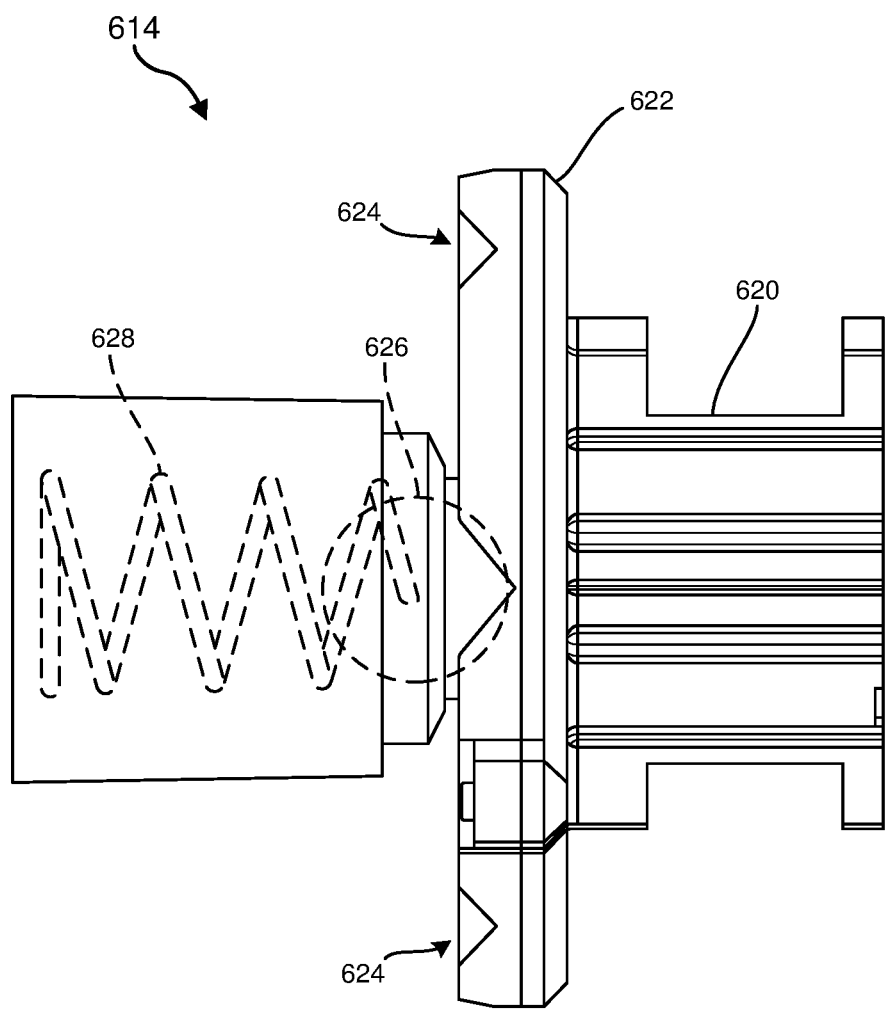
FIG. 8 is a side view of the detent mechanism of FIG. 7.
Figure 9:
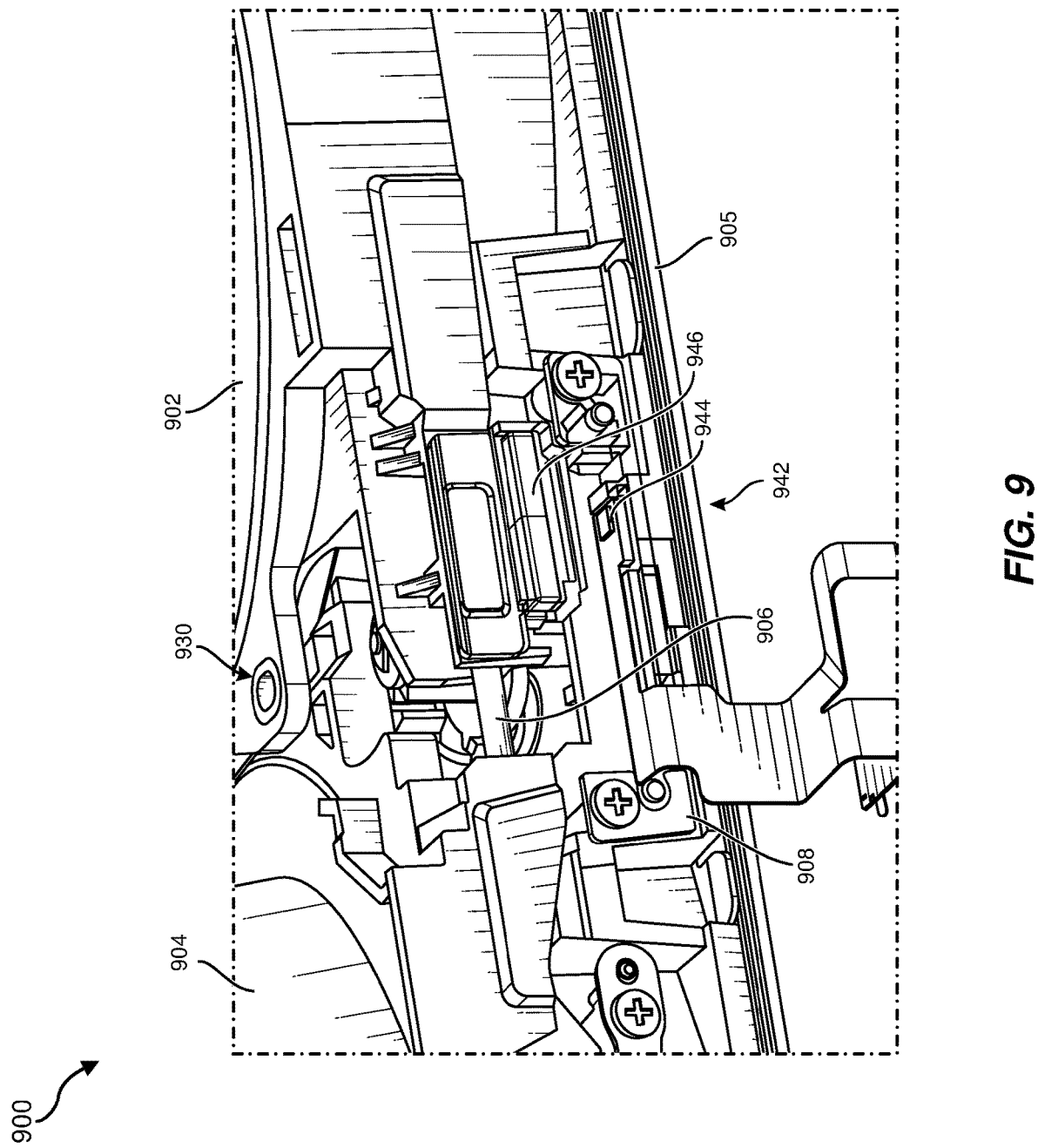
FIG. 9 is a perspective view of a portion of a head-mounted display assembly including a position sensor, according to at least one embodiment of the present disclosure.
Figure 10:
FIG. 10 is a flow diagram illustrating a method of fabricating a head-mounted display assembly, according to at least one embodiment of the present disclosure.

The following will provide, with reference to FIGS. 1A-3, detailed descriptions of various example HMD assemblies according to the present disclosure. With reference to FIGS. 4A and 4B, the following will provide detailed descriptions of example sliding interfaces for IPD adjustability of HMD assemblies of the present disclosure. With reference to FIG. 5, the following will provide detailed descriptions of example HMD assemblies according to additional embodiments of the present disclosure. With reference to FIGS. 10 and 11, the following will provide detailed descriptions of example methods of fabricating HMD assemblies and of adjusting an IPD of HMD assemblies, respectively. With reference to FIGS. 8 and 9, the following will provide detailed descriptions of example artificial-reality systems and environments that may be used in conjunction with HMD assemblies of the present disclosure.

Figure 1B:
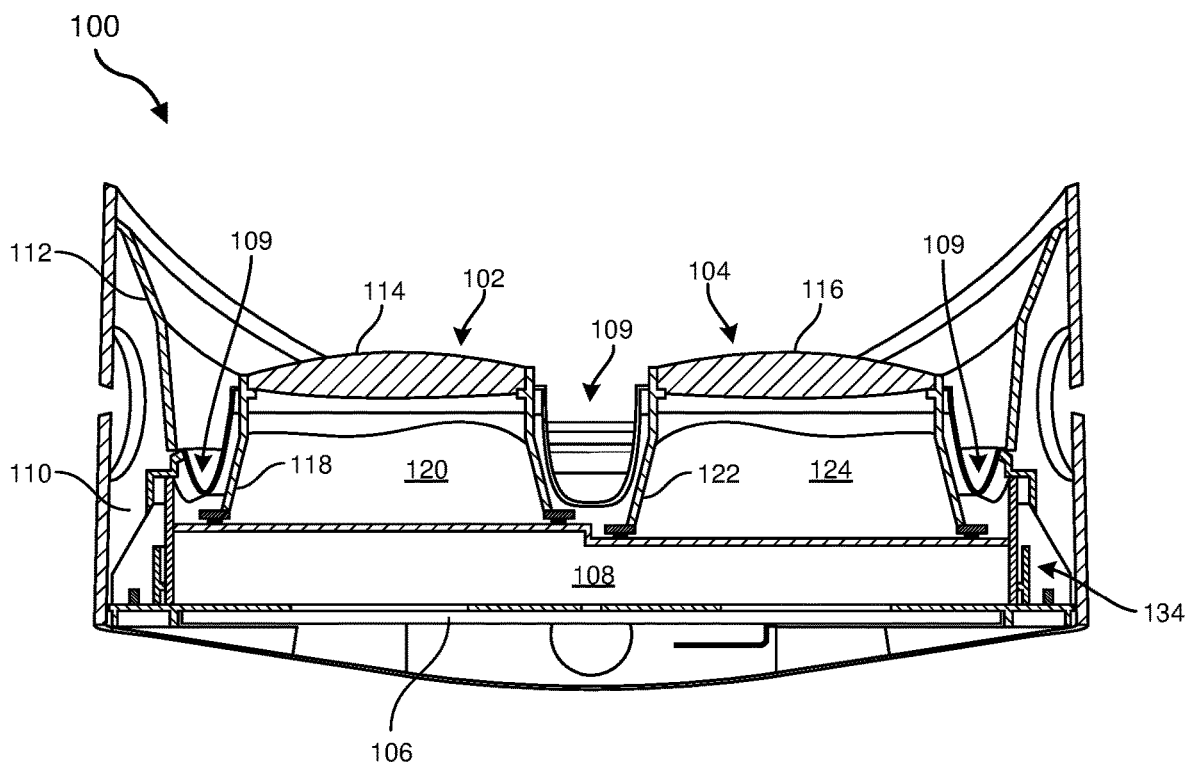

FIGS. 1A and 1B illustrate an HMD assembly 100 that may include a first eyecup 102 and a second eyecup 104 positioned over a single NED screen 106, with an enclosure 108 positioned between the eyecups 102, 104 and the single NED screen 106. FIG. 2 illustrates a detailed view of certain components of the HMD assembly 100. Referring to FIGS. 1A-2, the eyecups 102, 104, single NED screen 106, and enclosure 108 may be mounted on an HMD support frame 110, which may also support an eye bracket 112 that may be shaped and positioned for resting against the user's face when the HMD assembly 100 is donned by the user. In some examples, a flexible shroud 109 may be positioned over at least portions (e.g., peripheral portions) of the eyecups 102, 104, such as to provide an aesthetic cover and/or a dust cover over underlying components of the HMD assembly 100.

In some examples, relational terms, such as "first," "second," "upper," "lower," "over," "underlying," etc., may be used for clarity and convenience in understanding the disclosure and accompanying drawings and may not necessarily connote or depend on any specific preference, orientation, or order, except where the context clearly indicates otherwise.

The eyecups 102, 104 may be configured for positioning in front of intended locations of a user's eyes when the HMD assembly 100 is donned by the user. For example, the first eyecup 102 may be configured for viewing the single NED screen 106 with the user's left eye and the second eyecup 104 may be configured for viewing the single NED screen 106 with the user's right eye. The first eyecup 102 may support a first optical lens 114 and the second eyecup 104 may support a second optical lens 116. For example, each of the optical lenses 114, 116 may be a corrective ophthalmic lens (e.g., a positive-optical power (i.e., magnifying) lens, a negative-optical power (i.e., diminishing) lens, a lens for correction of an aberration, etc.), a zero-power optical lens, an adjustable (e.g., deformable) optical lens, a Fresnel lens, or another optical lens element. Optionally, an anti-reflective coating may be applied to the optical lenses 114, 116.

The first eyecup 102 may include a first rigid housing 118 at least partially defining a first interior volume 120. Similarly, the second eyecup 104 may include a second rigid housing 122 at least partially defining a second interior volume 124. A base of the first rigid housing 118 may include a first flange 126, which may extend radially outward from a sidewall of the first rigid housing 118. Similarly, a base of the second rigid housing 122 may include a second flange 128, which may extend radially outward from a sidewall of the second rigid housing 122.

The optical lenses 114, 116 may be sealed (e.g., hermetically sealed) against and supported by the rigid housings 118, 122. The optical lenses 114, 116 may be positioned to focus images displayed by the single NED screen 106 to the user's eyes when the HMD assembly 100 is donned by the user.

The enclosure 108 may include a first transparent component 130 positioned between the first optical lens 114 and the single NED screen 106 and a second transparent component 132 positioned between the second optical lens 116 and the single NED screen 106. An outer region of the first and second transparent components 130, 132 may be coupled to the eye-facing surface of the single NED screen 106 via a sealing structure 134 of the HMD support frame 110. Thus, the enclosure 108 may be defined by the first and second transparent components 130, 132, the single NED screen 106, and the sealing structure 134. In some examples, the enclosure 108 may be a hermetically sealed enclosure to inhibit the introduction of contaminants (e.g., particles) on the eye-facing surface of the single NED screen 106. Contamination that may be present over the first and second transparent components 130 (e.g., outside of the enclosure 108) may be substantially out-of-focus to a user viewing the single NED screen 106 through the optical lenses 114, 116.

By way of example and not limitation, the first and second transparent components 130, 132 may be or include the same material or two respective different materials. The first and second transparent components 130, 132 may include a glass material, a transparent polymeric material (e.g., polycarbonate, polymethylmethacrylate, polyethylene terephthalate, cyclic olefin copolymer, polypropylene, styrene methyl methacrylate, styrene acrylonitrile resin, polystyrene, etc.), and/or a crystalline material, etc. In some examples, the first and second transparent components 130, 132 may be substantially planar and may exhibit substantially zero optical power. The first and second transparent components 130, 132 may be stationary relative to the single NED screen 106, the eye bracket 112, and the sealing structure 134. By configuring the first and second transparent components 130, 132 as stationary relative to the single NED screen 106, the number of moving parts adjacent to the single NED screen 106 that might otherwise generate or move contaminants (e.g., particles) may be reduced.

A first sealing element 136 may be disposed between the first flange 126 and the first transparent component 130. A second sealing element 138 may be disposed between the second flange 128 and the second transparent component 130. The first and second sealing elements 136, 138 may be configured for allowing the first eyecup 102 and the second eyecup 104 to move (e.g., slide) relative to the first and second transparent components 130, 132, such as to adjust an IPD setting of the HMD assembly 100. The first and second sealing elements 136, 138 may be configured to inhibit particles from entering the first and second interior volumes 120, 124.

By way of example and not limitation, the first and second sealing elements 136, 138 may each be an O-ring, a foam (e.g., closed-cell foam) ring, a foam ring bonded to a structural base (e.g., a foam ring bonded to a polyethylene terephthalate base), a V-ring, an X-ring, a gasket, etc. The material of the first and second sealing elements 136, 138 may be or include a polymer material, such as an elastomeric material, a foam material, a combination thereof, etc.

As noted above, the first eyecup 102 and the second eyecup 104 may be movable (e.g., in a direction that is parallel to a surface of the single NED screen 106, such as in a left-and-right direction from the perspective of FIGS. 1A and 1B) relative to each other to adjust for an IPD of the user's eyes. At least one of the eyecups 102, 104 may also be movable relative to the single NED screen 106. In some embodiments, the first eyecup 102 and the second eyecup 104 may be movable relative to each other over a distance of up to about 10 mm. The eyecups 102, 104 may be independently movable relative to the HMD support frame 110, or the eyecups 102, 104 may be configured to simultaneously move inward (e.g., toward each other) or outward (e.g., away from each other) at substantially equal distances and rates relative to the single NED screen 106.

As shown in FIG. 1 by way of example, one or more IPD input mechanisms 140 (e.g., switches, sliders, knobs, buttons, etc.) may be integrated into the HMD support frame 110 and configured to allow the user of the HMD assembly 100 to adjust the IPD of the eyecups 102, 104 according to preference. Alternatively or additionally, IPD adjustments may be made by one or more electromechanical actuators (e.g., linear actuators, rotational motors, etc.), which may be controlled by a computing system associated with the HMD assembly 100 or by the user's manipulation of the IPD input mechanism(s) 140.

A first IPD setting $IPD_1$ may correspond to a distance between a first optical axis $A_1$ of the first optical lens 114 and a second optical axis $A_2$ of the second optical lens 116 when the first and second optical lenses 114 are in a first position, as shown in FIG. 2. A second IPD setting $IPD_2$ may correspond to the distance between the first and second optical axes $A_1$, $A_2$ when the first and second optical lenses 114 are in a second position, as shown in FIG. 3. In the example shown, the first eyecup 102 and the second eyecup 104 are closer to each other at the second IPD setting $IPD_2$ comparted to the first IPD setting $IPD_1$. Thus, the first IPD setting $IPD_1$ may be useful for a user that has a generally wide IPD, and the second IPD setting $IPD_2$ may be useful for a different user that has a generally narrow IPD.

Referring FIGS. 2 and 3, the first transparent component 130 may be positioned a first distance $D_1$ from the single NED screen 106 and the second transparent component 132 may be positioned a second distance $D_2$ from the single NED screen 106. By way of example and not limitation, each of the first distance $D_1$ and the second distance $D_2$ may be in the range of about 10 mm to about 20 mm.

In some embodiments, the first distance $D_1$ may be different from the second distance $D_2$. For example, the first distance $D_1$ may be at least about 2 mm greater than the second distance $D_2$. This difference between the first and second distances $D_1$, $D_2$ may enable a portion of the first and second flanges 126, 128 between the first and second eyecups 102, 104 to overlap when the first and second eyecups 102, 104 are close together (e.g., at the second IPD setting $IPD_2$), as shown in FIG. 3. Thus, the difference between the first and second distances $D_1$, $D_2$ may facilitate the positioning of the first and second eyecups 102, 104 closer together than would otherwise be possible without the difference, since the first and second flanges 126, 128 are at different levels and thus do not physically interfere with each other at the second IPD setting $IPD_2$.

The single NED screen 106 may include an electronic display screen for presenting visual content to the user. For example, the single NED screen 106 may include a liquid crystal display (LCD), light-emitting diode (LED) display, organic LED (OLED) display, a waveguide for directing light from a projector to the user, and/or any other suitable type of display screen. In some embodiments, the single NED screen 106 may be configured for displaying respective stereoscopic images to the user through the first eyecup 102 and the second eyecup 104 to create an impression of a three-dimensional image.

FIG. 4A illustrates a detailed cross-sectional view of a portion of an HMD assembly 400A. Like the HMD assembly 100 described above with reference to FIGS. 1A-3, the HMD assembly 400A of FIG. 4A may include a first eyecup 402 and a second eyecup 404 respectively disposed over a first transparent component 420 and a second transparent component 432. The first eyecup 402 may include a first rigid housing 418 and the second eyecup 404 may include a second rigid housing 422. A first flange 426 may extend radially outward from a sidewall of the first rigid housing 418, and a second flange 428 may extend radially outward from a sidewall of the second rigid housing 422. A first sealing element 436 may be positioned between the first flange 426 and the first transparent component 430 to form a seal (e.g., a hermetic seal) between the first eyecup 402 and the first transparent component 430. Likewise, a second sealing element 438 may be positioned between the second flange 428 and the second transparent component 432 to form a seal (e.g., a hermetic seal) between the second eyecup 404 and the second transparent component 432.

By way of example and not limitation, the first flange 426 may include a first groove 442 in which a portion of the first sealing element 436 may be positioned. Thus, the first sealing element 436 may be coupled to the first flange 426 and may be movable along with the first flange 426 relative to the first transparent component 430. A first sliding interface 444 may be between the first sealing element 436 and the first transparent component 430. Similarly, the second flange 428 may include a second groove 446 in which a portion of the second sealing element 438 may be positioned. The second sealing element 438 may be coupled to the second flange 428 and may be movable along with the second flange 428 relative to the second transparent component 432. A second sliding interface 448 may be between the second sealing element 438 and the second transparent component 432. In this case, to adjust for a user's IPD, the first and second eyecups 402, 404 and the first and second sealing elements 436, 438 may be movable relative to the first and second transparent components 430, 432.

FIG. 4B illustrates a detailed cross-sectional view of a portion of an HMD assembly 400B having a different configuration than the HMD assembly 400A of FIG. 4A. In this example, the first groove 442 may be located in the first transparent component 430 and a portion of the first sealing element 436 may be positioned in the first groove 442. Thus, the first sliding interface 444 may be between the first sealing element 436 and the first flange 426. Similarly, the second groove 446 may be located in the second transparent component 432 and a portion of the second sealing element 438 may be positioned in the second groove 446. Thus, the second sliding interface 448 may be between the second sealing element 438 and the second flange 428. In this case, to adjust for a user's IPD, the first and second eyecups 402, 404 may be movable relative to the first and second transparent components 430, 432 and relative to the first and second sealing elements 436, 438.

FIG. 5 is a perspective view of a portion of an HMD assembly 500, according to additional embodiments of the present disclosure. Some components of the HMD assembly 500 are removed in FIG. 5 to better view underlying portions of the HMD assembly 500. The HMD assembly 500 of FIG. 5 may be similar to the HMD assembly 100 described above with reference to FIGS. 1A-3. For example, the HMD assembly 500 may include a first eyecup 502 and a second eyecup 504 positioned over a single NED screen 506. The eyecups 502, 504 and the single NED screen 506 may be coupled to and supported by an HMD support frame 510. The first eyecup 502 may include a first rigid housing 518 to which a first optical lens 514 may be coupled. The second eyecup 504 may include a second rigid housing 522 to which a second optical lens (not shown in the view of FIG. 5 for clarity) may be coupled. The first rigid housing 518 may at least partially define a first interior volume 520 of the first eyecup 502. Similarly, the second rigid housing 522 may at least partially define a second interior volume 524 of the second eyecup 504.

The first and second eyecups 502, 504 may be positioned over and movable relative to an enclosure 508 (shown in dashed lines in FIG. 5) that may be positioned over the single NED screen 506. The enclosure 508 may be hermetically sealed to inhibit the introduction of contamination on a user-facing surface of the single NED screen 506.

The eyecups 502, 504 may be movable relative to each other and/or relative to the single NED screen 506, such as to adjust for the user's IPD. The HMD assembly 500 of FIG. 5 may also include an IPD adjustment mechanism 550, which may include a track 552 (e.g., a rod, a slide, etc.), a first IPD adjustment bracket 554 slidably coupling the first rigid housing 518 to the track 552, and a second IPD adjustment bracket 556 slidably coupling the second rigid housing 522 to the track 552. The IPD adjustment mechanism 550 may, in some examples, also include one or more IPD input mechanisms (not shown in the view of FIG. 5, but similar to the IPD input mechanism 140 described above) with which the user may interact to control the movement of the eyecups 502, 504 for IPD adjustments. In addition or alternatively, a cam, pusher, electromechanical actuator (e.g., a motor, a linear actuator, etc.), or other suitable component may be included to move the IPD adjustment brackets 554, 556 and eyecups 502, 504 along the track 552.

As illustrated in FIG. 5, the IPD adjustment brackets 554, 556 may, in some embodiments, each include two spaced apart slider elements 558 engaged with and movable along the track 552, such as to provide sufficient stability to the respective eyecups 502, 504. The slider elements 558 may be engaged with the track 552 in a manner that maintains the eyecups 502, 504 in position after an IPD adjustment is made. In some examples, a detent mechanism 560 (shown in FIG. 5 in dashed lines) may be employed to maintain the eyecups 502, 504 in their relative position after an IPD adjustment is made. For example, the detent mechanism 560 may include a ratchet, a frictional interface, a pin and rack, or another suitable mechanism for maintaining the relative positions of the eyecups 502, 504. In some examples, the HMD assembly 500 may optionally include another set of a track and IPD adjustment brackets positioned on an opposite side of the eyecups 502, 504 from the track 552 and IPD adjustment brackets 554, 556 shown in FIG. 5, such as for additional mechanical stability.

Figure 6:
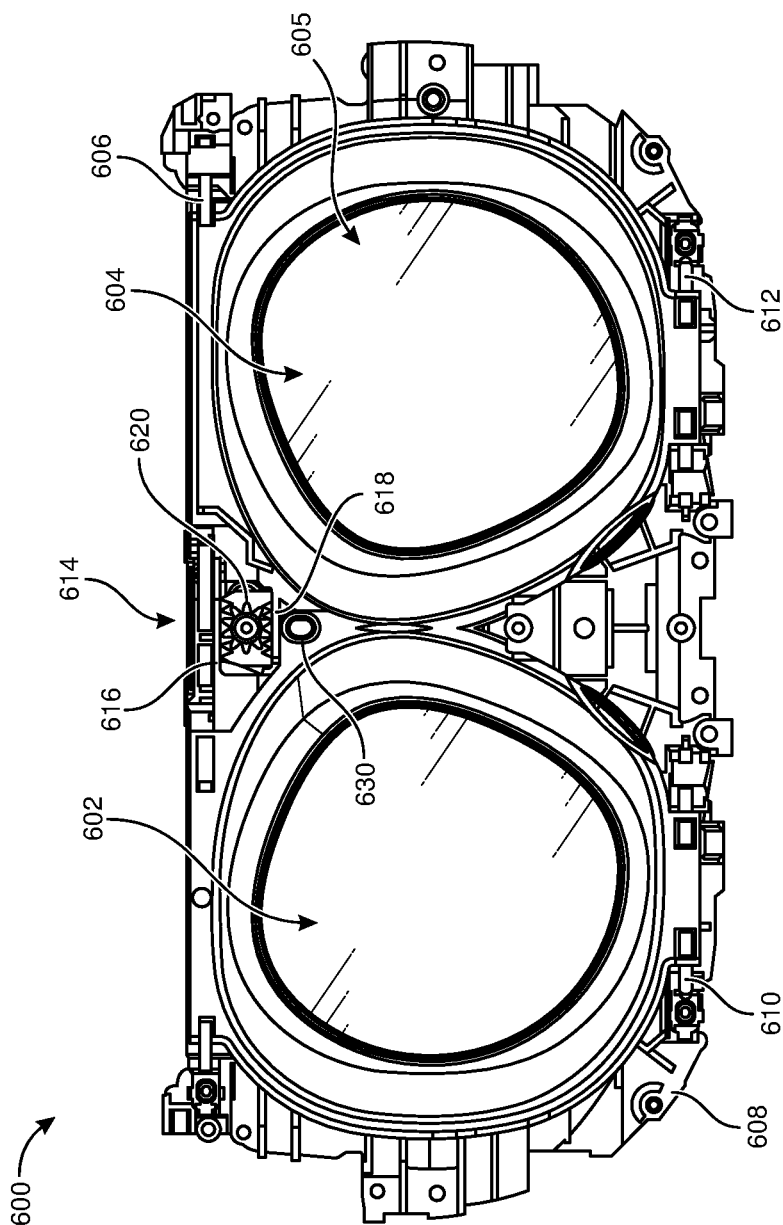
FIG. 6 is a front view of a head-mounted display assembly, according to at least one additional embodiment of the present disclosure.

FIG. 6 is a front view of an HMD assembly 600 that may include a first eyecup 602 (e.g., a left eyecup for positioning a first optical lens over a left eye of an intended user) and a second eyecup 604 (e.g., a right eyecup for positioning a second optical lens over a right eye of the intended user) positioned over a single NED screen 605. As discussed above, an enclosure may be positioned between the eyecups 602, 604 and the single NED screen 605. The eyecups 602, 604, and single NED screen may be mounted on an HMD support frame 608.

The eyecups 602, 604 may be movable relative to the HMD support frame 608 and/or relative to each other to adjust for a user's IPD. For example, each of the eyecups 602, 604 may be slidably coupled to and movable along an upper track 606 (e.g., a rod, a slide, etc.) that may be mounted on the HMD support frame 608. The eyecups 602, 604 may also be respectively slidably coupled to and movable along a first lower track 610 and a second lower track 612 that may be mounted on the HMD support frame 608. The first lower track 610 and second lower track 612 may be positioned on opposite sides of the eyecups 602, 604 from the upper track 606. As illustrated in FIG. 6, in some examples the first lower track 610 and second lower track 612 may be separated from each other, such as to accommodate an intended user's nose. In additional examples, the first lower track 610 and second lower track 612 may be portions of a single, integral, unitary track.

The HMD assembly 600 may also include a detent mechanism 614 to maintain the eyecups 602, 604 in position relative to each other and relative to the HMD support frame 608. In some embodiments, the detent mechanism 614 may also be configured to keep each of the eyecups 602, 604 substantially equidistant from a lateral centerline of the HMD assembly 600. As illustrated in FIG. 6, the detent mechanism 614 may include a first rack 616 extending inward from the first eyecup 602, a second rack 618 extending inward from the second eyecup 604, and a pinion 620 engaged with the first rack 616 and second rack 618. The pinion 620 may be rotatably coupled to the HMD support frame 608. Teeth of the pinion 620 may be engaged with teeth of the first rack 616 on a first side of the pinion 620 and with teeth of the second rack 618 on a second, opposite side of the pinion 620. Thus, when the first eyecup 602 moves inward (e.g., to the right from the perspective of FIG. 6), the second eyecup 604 may also move inward (e.g., to the left from the perspective of FIG. 6) due to rotation of the pinion 620. Similarly, when the first eyecup 602 moves outward (e.g., to the left from the perspective of FIG. 6), the second eyecup 604 may also move outward (e.g., to the right from the perspective of FIG. 6) due to rotation of the pinion 620 in an opposite direction.

The detent mechanism 614 may include a feature that enables the eyecups 602, 604 to be maintained in position once moved. For example, the eyecups 602, 604 may be maintained in two, three, four, or five distinct positions by the detent mechanism 614. An example embodiment of the detent mechanism 614 capable of maintaining the eyecups 602, 604 in position is illustrated in FIGS. 7 and 8.

Figure 7:
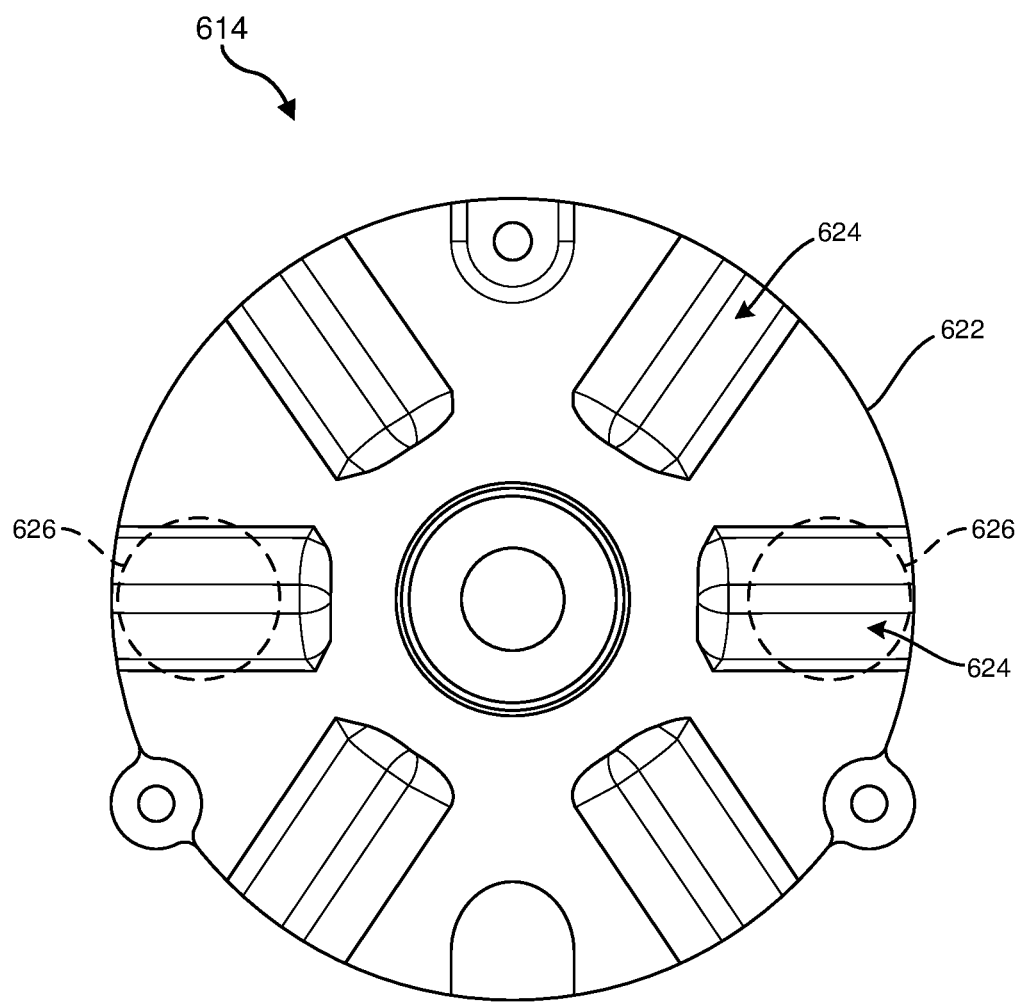
FIG. 7 is a back view of a detent mechanism of the head-mounted display assembly of FIG. 6, according to at least one embodiment of the present disclosure.

FIG. 7 is a back view of the detent mechanism 614, and FIG. 8 is a side view of the detent mechanism 614. As shown in FIG. 8, the pinion 620 may be mounted on a detent base 622. As shown in FIGS. 7 and 8, the detent base 622 may include grooves 624 in a back face thereof that is opposite the pinion 620. One or more detent extensions 626 may be mounted to the HMD support frame 608 (FIG. 6). In the embodiment shown, there are two detent extensions 626, although a single detent extensions 626 or more than two detent extensions 626 may be used in additional embodiments. The detent extensions 626 may be biased (e.g., spring-loaded) toward the detent base 622 and positioned relative to at least one of the grooves 624 to protrude into the respective grooves 624 when the detent extensions 626 and the grooves 624 are aligned with each other.

For example, as shown in FIGS. 7 and 8, the detent extensions 626 may include a ball that is biased toward the detent base 622 by a coil spring 628. However, the detent extensions 626 of the present disclosure are not limited to this configuration. In additional embodiments, the detent extensions 626 may have a cylindrical shape, a hemispherical shape, a pin shape, a shaft with a rounded end, a shaft with an angled end (e.g., having a triangular or trapezoidal longitudinal cross section), or any other suitable shape. In addition, the detent extension 626 may be biased toward the detent base 622 with a biasing element that is not a coil spring, such as a leaf spring, an elastomer, or another suitable biasing element.

The detent mechanism 614 may be configured to position the eyecups 602 at predetermined IPD settings. For example, the eyecups 602, 604 may be moved inward or outward by a user applying an inward or outward physical force directly on one or both of the eyecups 602, 604. In additional embodiments, an IPD adjustment mechanism may be used, such as the IPD adjustment mechanism 140 described above with reference to FIG. 1A or an electromechanical actuator. When the eyecups 602, 604 (FIG. 6) are moved inward or outward, the first rack 616 and/or the second rack 618 may interact with the pinion 620 to rotate the pinion 620. Rotation of the pinion 620 may in turn rotate the detent base 622. As the detent base 622 rotates, the detent extensions 626 may be forced out of the respective grooves 624 against the biasing force applied by the coil spring 628. As the detent base 622 continues to rotate, the detent extensions 626 may be biased into other adjacent grooves 624, providing a tactile indication (e.g., a snap or click) to the user that the eyecups 602, 604 are at a predetermined IPD setting. The grooves 624 may be sized and spaced to correspond to a certain number of predetermined IPD settings, such as two (e.g., large and small), three (e.g., large, medium, and small), four, or five predetermined IPD settings. In one example, the grooves 624 may be sized and spaced to correspond to a first small IPD setting of about 58 mm measured between optical axes of the eyecups 602, 604, a second medium IPD setting of about 63 mm, and a third large IPD setting of about 68 mm.

Referring again to FIG. 6, in some examples, the HMD assembly 600 may also include an IPD indicator 630 to provide an indication of the current IPD setting. For example, the IPD indicator 630 may include an aperture through a structure coupled to either the first eyecup 602 or the second eyecup 604. Beneath the aperture, there may be a visual indication of the IPD setting. For example, the visual indication may include the letters S, M, and L corresponding to a small, medium, and large IPD setting. Other example visual indications may include numbers (e.g., 1 through 5 corresponding to five IPD settings, or 58, 63, and 68 corresponding to the IPD setting in millimeters, etc.), other letters (e.g., A through D corresponding to four IPD settings, "min," "med," and "max" corresponding to minimum, medium, and maximum IPD settings, etc.), colors (e.g., green, yellow, and red corresponding to three IPD settings, etc.), a diagram (e.g., showing eyes at different distances from each other, etc.), or combinations thereof. When the detent mechanism 614 is used to set the eyecups 602, 604 to one of the predetermined IPD settings, the aperture of the IPD indicator 630 may be aligned with one of the visual indications of the IPD settings, such that a user can view the visual indication through the aperture to determine the current IPD setting.

Even with the detent mechanism 614, the HMD assembly 600 may benefit from a position sensor to accurately measure and/or verify the current IPD setting of the HMD assembly 600. FIG. 9 illustrates a portion of an HMD assembly 900 with an IPD position sensor 942. In some respects, the HMD assembly 900 may be similar to the HMD assembly 600 of FIG. 6. For example, the HMD assembly 900 may include a first eyecup 902, a second eyecup 904, a single NED screen 905, a track 906 along which the eyecups 902, 904 may be movable for adjusting an IPD setting, an HMD support frame 908, a detent mechanism 914, and an IPD indicator 930.

The IPD position sensor 942 may be configured to sense a lateral position of one or both of the eyecups 902, 904 relative to each other and/or relative to the HMD support frame 908. For example, the IPD position sensor 942 may include a Hall effect sensor, a rotary encoder, a linear encoder, or another suitable position sensor. In the example shown in FIG. 9, the IPD position sensor 942 is illustrated as a Hall effect sensor configured to sense a magnitude of a magnetic field of a moving magnet. The IPD position sensor 942 may include a probe 944 mounted to the HMD support frame 908 and a permanent magnet 946 mounted to one of the eyecups 902, 904. When the eyecups 902, 904 are laterally moved, the permanent magnet 946 may move relative to the probe 944. The movement of the permanent magnet 946 may result in a change in magnitude of a magnetic field sensed by the probe 944. This change in magnitude sensed by the probe 944 may be correlated to a relative position between the probe 944 and the permanent magnet 946, and ultimately to a relative position between the eyecups 902, 904. The data from the IPD position sensor 942 may be used to determine the actual IPD setting of the eyecups 902, 904, such as for use by software to adjust an image displayed on the single NED screen 905, to provide an indication to the user of the IPD setting, etc.

In the embodiment illustrated in FIG. 9, the probe 944 is mounted on the HMD support frame 908 and the permanent magnet 946 is mounted on one of the eyecups 902, 904. However, the present disclosure is not limited to this configuration. In additional embodiments, the probe 944 may be mounted on one of the eyecups 902, 904 and the permanent magnet 946 may be mounted on the HMD support frame 908, or the probe may be mounted on one of the eyecups 902, 904 and the permanent magnet 946 may be mounted on the other of the eyecups 902, 904. In yet further embodiments, the permanent magnet 946 may be replaced by a non-permanent magnet, such as an electromagnet. In additional embodiments, as noted above, the IPD position sensor 942 may be another type of position sensor other than a Hall effect sensor.

FIG. 10 is a flow diagram illustrating a method 1000 of fabricating an HMD assembly, according to at least one embodiment of the present disclosure. At operation 1010, a first transparent component and a second transparent component may be positioned and hermetically sealed over a single NED screen to form an enclosure. Operation 1010 may be performed in a variety of ways. For example, the first transparent component may be positioned a first distance from the single NED screen and the second transparent component may be positioned a second, different distance from the single NED screen. In some embodiments, the hermetic seal may be accomplished with sealing structure that may couple the transparent components to the single NED screen.

At operation 1020, a first eyecup supporting a first lens may be slidably positioned over the first transparent component. Operation 1020 may be performed in a variety of ways. For example, a first sealing element may be positioned between the first eyecup and the first transparent component. A first sliding interface may be between the first eyecup and the first sealing element or, alternatively, may be between the first transparent component and the first sealing element.

At operation 1030, a second eyecup supporting a second lens may be slidably positioned over the second transparent component. Operation 1030 may be performed in a variety of ways. For example, a second sealing element may be positioned between the second eyecup and the second transparent component. A second sliding interface may be between the second eyecup and the second sealing element or, alternatively, may be between the second transparent component and the second sealing element. The first eyecup and the second eyecup may be movable relative to each other, such as to adjust for an IPD of a user of the HMD assembly. In some embodiments, the respective distances between the single NED screen and the first and second transparent components may be different, such as to allow flanges extending radially outward from the eyecups to at least partially overlap each other when an IPD setting of the eyecups is at its minimum operating position.

In some examples, the method 1000 may also include additional operations. For example, an IPD adjustment mechanism may be assembled to the first eyecup and to the second eyecup in a position to move the first eyecup and the second eyecup relative to each other, such as to adjust for an IPD.

FIG. 11 is a flow diagram illustrating a method 1100 of adjusting an interpupillary distance of an HMD assembly, according to at least one embodiment of the present disclosure. At operation 1110, a first eyecup may be moved over a first transparent component that is positioned over a single NED screen. At operation 1120, a second may be moved over a second transparent component that is positioned over the single NED screen. Operations 1110 and 1120 may be performed in a variety of ways. For example, the eyecups may be moved toward or away from each other to adjust for a user's IPD. The single NED screen, the first transparent component, and the second transparent component may define a hermetically sealed enclosure.

Accordingly, the present disclosure includes HMD assemblies and related methods that may enable IPD adjustments that inhibit (e.g., reduce or eliminate) the introduction of contamination onto a display screen. At the same time, the disclosed HMD assemblies may include a single NED screen, which may reduce a cost of fabricating and operating the HMD assemblies. Various configurations and materials are disclosed, each of which may be advantageously employed for a variety of uses and applications.

As noted above, embodiments of the present disclosure may include or be implemented in conjunction with various types of artificial-reality systems. Artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Artificial-reality systems may include an NED that provides visibility into the real world (e.g., an augmented-reality system) or that visually immerses a user in an artificial reality (e.g., virtual-reality system 1200 in FIG. 12). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

As noted, some artificial-reality systems may substantially replace one or more of a user's sensory perceptions of the real world with a virtual experience. One example of this type of system is a head-worn display system, such as the virtual-reality system 1200 in FIG. 12, that mostly or completely covers a user's field of view. The virtual-reality system 1200 may include a front rigid body 1202 and a band 1204 shaped to fit around a user's head. The virtual-reality system 1200 may also include output audio transducers 1206(A) and 1206(B). Furthermore, while not shown in FIG. 12, the front rigid body 1202 may include one or more electronic elements, including one or more electronic displays, one or more inertial measurement units (IMUS), one or more tracking emitters or detectors, and/or any other suitable device or system for creating an artificial reality experience.

Artificial-reality systems may include a variety of types of visual feedback mechanisms. For example, display devices in the virtual-reality system 1200 may include one or more liquid crystal displays (LCDs), light-emitting diode (LED) displays, organic LED (OLED) displays, and/or any other suitable type of display screen. As discussed above artificial-reality systems may include a single display screen for both eyes. Some artificial-reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial-reality systems may include one or more projection systems. For example, display devices in the virtual-reality system 1200 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, the virtual-reality system 1200 may include one or more optical sensors, such as two-dimensional (2D) or 3D cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the example shown in FIG. 12, the output audio transducers 1206(A), and 1206(B) may include voice coil speakers, ribbon speakers, electrostatic speakers, piezoelectric speakers, bone conduction transducers, cartilage conduction transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

Figure 12:
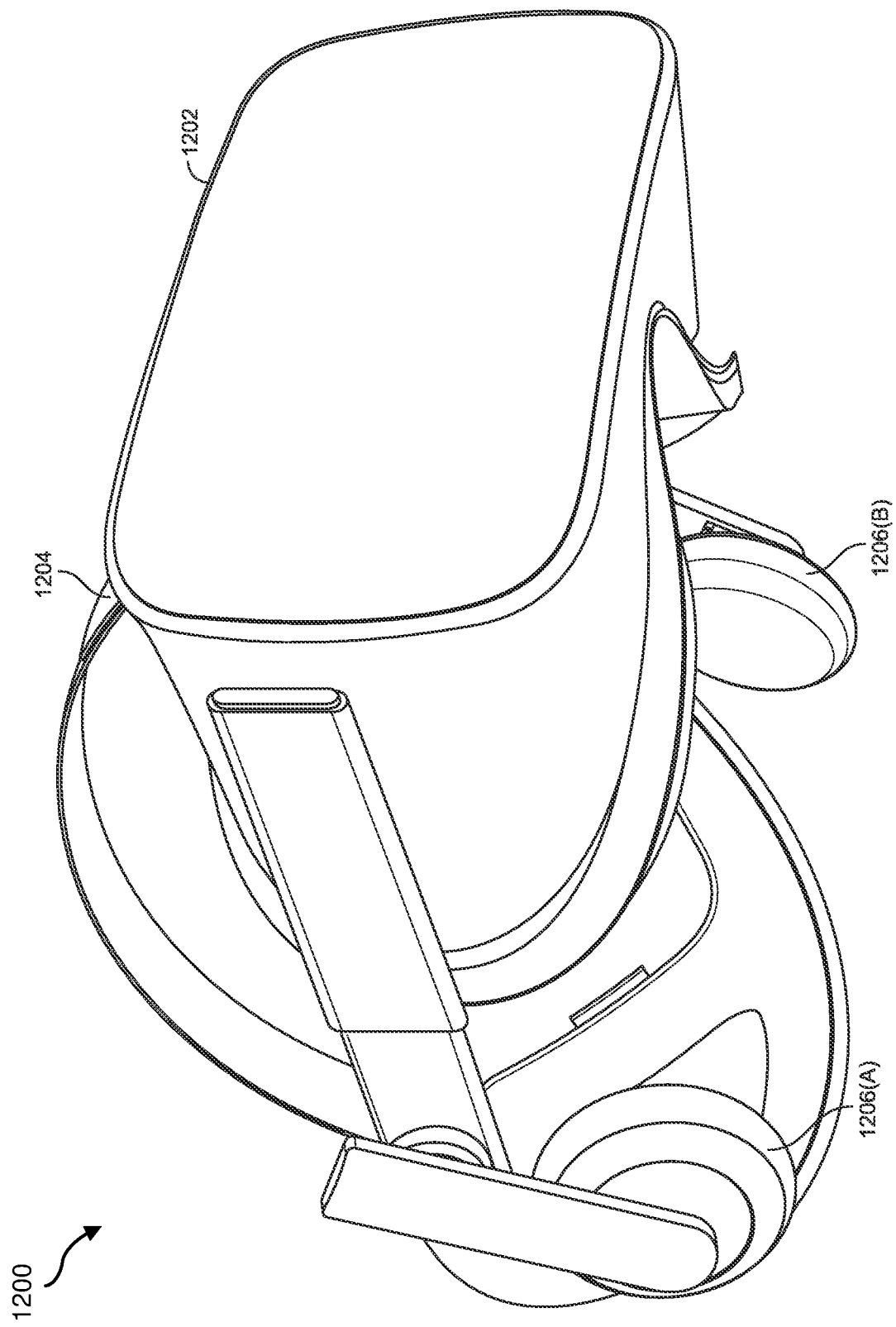
FIG. 12 is an illustration of an example virtual-reality headset that may be used in connection with embodiments of this disclosure.

While not shown in FIG. 12, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

As noted, the artificial-reality system 1200 may be used with a variety of other types of devices to provide a more compelling artificial-reality experience. These devices may include haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Haptic feedback may be provided by interfaces positioned within a user's environment (e.g., chairs, tables, floors, etc.) and/or interfaces on articles that may be worn or carried by a user (e.g., gloves, wristbands, etc.). As an example, a vibrotactile system may be in the form of a wearable glove and/or wristband. The haptic device may include a flexible, wearable textile material that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

Figure 13:
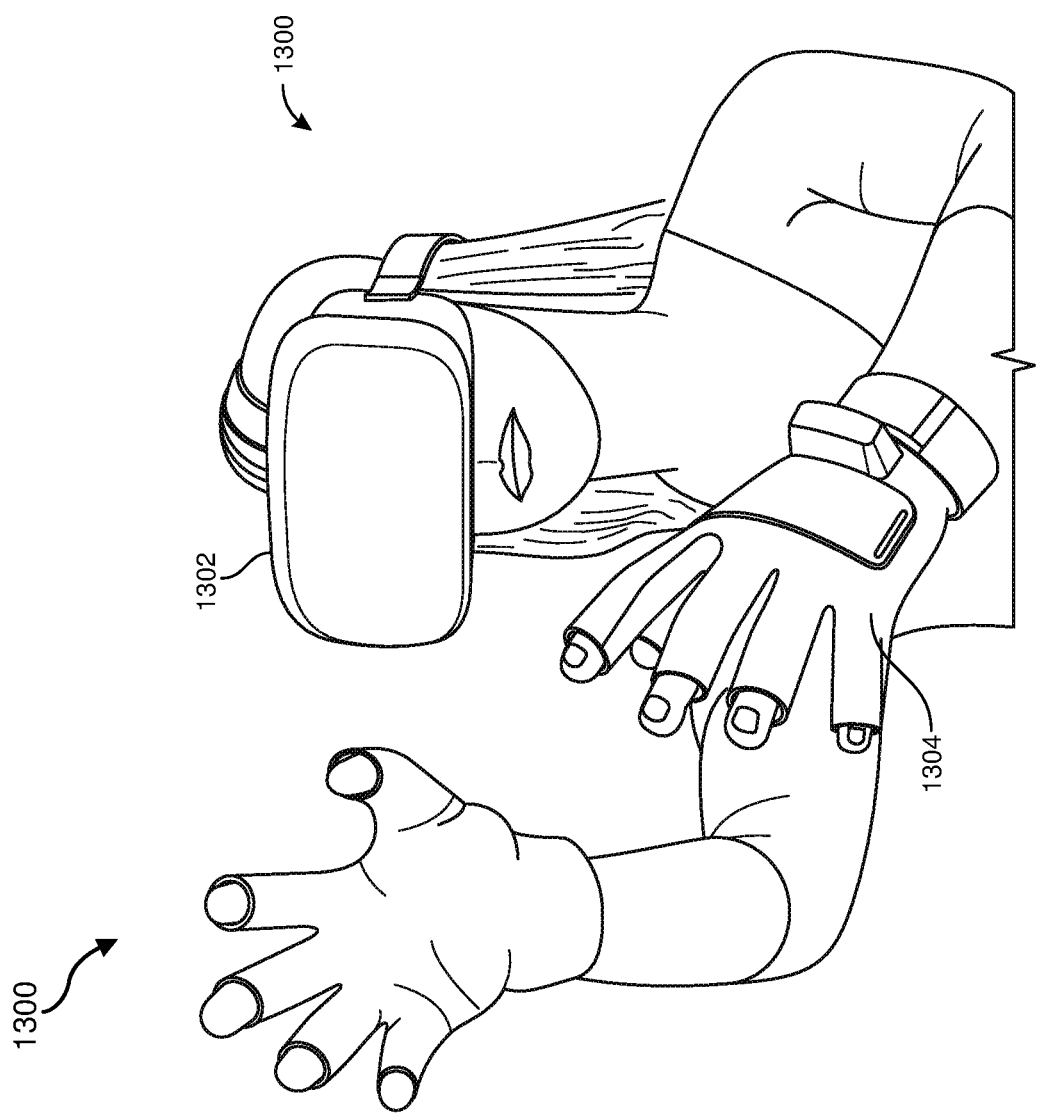
FIG. 13 is an illustration of an example virtual-reality environment according to embodiments of this disclosure.

Haptic wearables may be implemented in a variety of types of artificial-reality systems and environments. FIG. 13 shows an example artificial-reality environment 1300 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Head-mounted display 1302 generally represents any type or form of virtual-reality system, such as the virtual-reality system 1200 in FIG. 12. Haptic device 1304 generally represents any type or form of wearable device, worn by a use of an artificial-reality system, that provides haptic feedback to the user to give the user the perception that he or she is physically engaging with a virtual object. In some embodiments, the haptic device 1304 may provide haptic feedback by applying vibration, motion, and/or force to the user. For example, the haptic device 1304 may limit or augment a user's movement. To give a specific example, the haptic device 1304 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use the haptic device 1304 to send action requests to a console. Examples of action requests include, without limitation, requests to start an application and/or end the application and/or requests to perform a particular action within the application.

The haptic devices 1304 may include any suitable number and/or type of haptic transducer, sensor, and/or feedback mechanism. For example, the haptic devices 1304 may include one or more mechanical transducers, piezoelectric transducers, and/or fluidic transducers. The haptic devices 1304 may also include various combinations of different types and forms of transducers that work together or independently to enhance a user's artificial-reality experience.

By way of non-limiting examples, the following embodiments are included in the present disclosure.

Example 1: A head-mounted display assembly, which may include: a first eyecup and a second eyecup configured for respectively positioning a first lens and a second lens in front of intended locations of a user's eyes when the head-mounted display assembly is donned by the user; a single near-eye display screen configured for displaying an image to the user through the first eyecup and the second eyecup; and an enclosure over the single near-eye display screen, the enclosure including: a first transparent component positioned between the first lens and the single near-eye display screen; and a second transparent component positioned between the second lens and the single near-eye display screen, wherein the first eyecup and the second eyecup are movable relative to each other and relative to the first transparent component and the second transparent component to adjust for an interpupillary distance of the user's eyes.

Example 2: The head-mounted display assembly of Example 1, wherein at least one of the first eyecup or the second eyecup is movable relative to the single near-eye display screen.

Example 3: The head-mounted display assembly of Example 1 or Example 2, wherein the first transparent component is positioned a first distance from the single near-eye display screen and the second transparent component is positioned a second distance from the single near-eye display screen, wherein the second distance is less than the first distance.

Example 4: The head-mounted display assembly of Example 3, wherein each of the first distance and the second distance is in a range of about 10 mm to about 20 mm.

Example 5: The head-mounted display assembly of Example 3 or 4, wherein a difference between the first distance and the second distance is at least about 2 mm.

Example 6: The head-mounted display assembly of any of Examples 1 through 5, wherein the first transparent component and the second transparent component may include at least one of: a polymer material; a glass material; or a crystalline material.

Example 7: The head-mounted display assembly of any of Examples 1 through 6, wherein the enclosure may include a hermetically sealed enclosure defined over the single near-eye display screen and under the first transparent component and the second transparent component.

Example 8: The head-mounted display assembly of any of Examples 1 through 7, wherein the first transparent component and the second transparent component are positioned a distance from the single near-eye display screen such that contaminants disposed on the first transparent component and the second transparent component are substantially out-of-focus to a user viewing the single near-eye display screen through the first lens and the second lens.

Example 9: The head-mounted display assembly of any of Examples 1 through 8, which may further include a first sealing element positioned between the first eyecup and the first transparent component and a second sealing element positioned between the second eyecup and the second transparent component.

Example 10: The head-mounted display assembly of Example 9, wherein a first sliding interface is between the first sealing element and the first transparent component and a second sliding interface is between the second sealing element and the second transparent component.

Example 11: The head-mounted display assembly of Example 9, wherein a first sliding interface is between the first sealing element and the first eyecup and a second sliding interface is between the second sealing element and the second eyecup.

Example 12: The head-mounted display assembly of any of Examples 9 through 11, wherein each of the first sealing element and the second sealing element may include at least one of: an elastomeric material; or a closed-cell foam material.

Example 13: The head-mounted display assembly of any of Examples 1 through 12, wherein: the first eyecup may include a first sidewall and a first flange extending radially outward from the first sidewall adjacent to the first transparent component; and the second eyecup may include a second sidewall and a second flange extending radially outward from the second sidewall adjacent to the second transparent component.

Example 14: The head-mounted display assembly of any of Examples 1 through 13, which may further include an interpupillary distance adjustment mechanism coupled to the first eyecup and to the second eyecup for adjusting a distance between the first eyecup and the second eyecup.

Example 15: The head-mounted display assembly of Example 14, which may further include a detent mechanism configured to maintain a relative position of the first eyecup and the second eyecup after an adjustment is made for the interpupillary distance of the user's eyes.

Example 16: The head-mounted display assembly of any of Examples 1 through 15, wherein the first eyecup and the second eyecup are movable relative to each other over a distance of up to about 10 mm.

Example 17: A method of fabricating a head-mounted display assembly, which may include: hermetically sealing a first transparent component and a second transparent component over a single near-eye display screen to form an enclosure; slidably positioning a first eyecup supporting a first lens over the first transparent component; and slidably positioning a second eyecup supporting a second lens over the second transparent component, wherein the first eyecup and the second eyecup are positioned to move relative to each other and relative to the first transparent component and the second transparent component to adjust for an interpupillary distance of a user's eyes when the head-mounted display assembly is donned by the user.

Example 18: The method of Example 17, which may further include: positioning a first sealing element between the first eyecup and the first transparent component; and positioning a second sealing element between the second eyecup and the second transparent component.

Example 19: The method of Example 17 or 18, which may further include positioning the first transparent component at a first distance from the single near-eye display screen and positioning the second transparent component at a second distance from the single near-eye display screen, wherein the second distance is less than the first distance.

Example 20: An artificial-reality device, which may include: a first eyecup including a first lens; a second eyecup including a second lens, wherein the first eyecup and the second eyecup are movable relative to each other to adjust for an interpupillary distance of a user's eyes; a single near-eye display screen configured for displaying an image to the user through the first eyecup and the second eyecup; at least one processor configured for rendering the image for display on the single near-eye display screen; and an enclosure over the single near-eye display screen, the enclosure including: a first transparent component positioned between the first lens and the single near-eye display screen; and a second transparent component positioned between the second lens and the single near-eye display screen, wherein the first transparent component and the second transparent component are stationary relative to the single near-eye display screen.

Example 21: A method of adjusting an interpupillary distance of a head-mounted display assembly, which may include: moving a first eyecup over a first transparent component that is positioned over a single near-eye display screen; and moving a second eyecup over a second transparent component that is positioned over the single near-eye display screen, wherein the single near-eye display screen, the first transparent component, and the second transparent component define a hermetically sealed enclosure.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A head-mounted display assembly, comprising:
   a first eyecup and a second eyecup configured for respectively positioning a first lens and a second lens in front of intended locations of a user's eyes when the head-mounted display assembly is donned by the user;
   a single near-eye display screen configured for displaying an image to the user through the first eyecup and the second eyecup; and
   an enclosure over the single near-eye display screen, the enclosure comprising:
      a first transparent component positioned between the first lens and the single near-eye display screen; and
      a second transparent component positioned between the second lens and the single near-eye display screen,
   wherein the first eyecup and the second eyecup are movable relative to each other and relative to the first transparent component and the second transparent component to adjust for an interpupillary distance of the user's eyes, and
   wherein the first transparent component and the second transparent component are positioned a distance from the single near-eye display screen such that contaminants disposed on the first transparent component and the second transparent component are substantially out-of-focus to a user viewing the single near-eye display screen through the first lens and the second lens.

2. The head-mounted display assembly of claim 1, wherein the first transparent component is positioned a first distance from the single near-eye display screen and the second transparent component is positioned a second distance from the single near-eye display screen, wherein the second distance is less than the first distance.

3. The head-mounted display assembly of claim 2, wherein each of the first distance and the second distance is in a range of about 10 mm to about 20 mm.

4. The head-mounted display assembly of claim 2, wherein a difference between the first distance and the second distance is at least about 2 mm.

5. The head-mounted display assembly of claim 1, wherein at least one of the first eyecup or the second eyecup is movable relative to the single near-eye display screen.

6. The head-mounted display assembly of claim 1, wherein the first transparent component and the second transparent component comprise at least one of:
   a polymer material;
   a glass material; or
   a crystalline material.

7. The head-mounted display assembly of claim 1, wherein the enclosure comprises a hermetically sealed enclosure defined over the single near-eye display screen and under the first transparent component and the second transparent component.

8. The head-mounted display assembly of claim 1, further comprising a first sealing element positioned between the first eyecup and the first transparent component and a second sealing element positioned between the second eyecup and the second transparent component.

9. The head-mounted display assembly of claim 8, wherein a first sliding interface is between the first sealing element and the first transparent component and a second sliding interface is between the second sealing element and the second transparent component.

10. The head-mounted display assembly of claim 8, wherein a first sliding interface is between the first sealing element and the first eyecup and a second sliding interface is between the second sealing element and the second eyecup.

11. The head-mounted display assembly of claim 8, wherein each of the first sealing element and the second sealing element comprises at least one of:
   an elastomeric material; and
   a closed-cell foam material.

12. The head-mounted display assembly of claim 1, wherein:
   the first eyecup comprises a first sidewall and a first flange extending radially outward from the first sidewall adjacent to the first transparent component; and the second eyecup comprises a second sidewall and a second flange extending radially outward from the second sidewall adjacent to the second transparent component.

13. The head-mounted display assembly of claim 1, further comprising an interpupillary distance adjustment mechanism coupled to the first eyecup and to the second eyecup for adjusting a distance between the first eyecup and the second eyecup.

14. The head-mounted display assembly of claim 13, further comprising a detent mechanism configured to maintain a relative position of the first eyecup and the second eyecup after an adjustment is made for the interpupillary distance of the user's eyes.

15. The head-mounted display assembly of claim 1, wherein the first eyecup and the second eyecup are movable relative to each other over a distance of up to about 10 mm.

16. A method of fabricating a head-mounted display assembly, comprising:
   hermetically sealing a first transparent component and a second transparent component over a single near-eye display screen to form an enclosure, wherein the first transparent component is positioned a first distance from the single near-eye display and the second transparent component is positioned a second distance from the single near-eye display screen, wherein the second distance is at least about 2 mm different from the first distance;
   slidably positioning a first eyecup supporting a first lens over the first transparent component; and
   slidably positioning a second eyecup supporting a second lens over the second transparent component, wherein the first eyecup and the second eyecup are positioned to move relative to each other and relative to the first transparent component and the second transparent component to adjust for an interpupillary distance of a user's eyes when the head-mounted display assembly is donned by the user.

17. The method of claim 16, further comprising:
   positioning a first sealing element between the first eyecup and the first transparent component; and
   positioning a second sealing element between the second eyecup and the second transparent component.

18. The method of claim 16, further comprising positioning the first transparent component at a first distance from the single near-eye display screen and positioning the second transparent component at a second distance from the single near-eye display screen, wherein the second distance is less than the first distance.

19. An artificial-reality device, comprising:
   a first eyecup comprising a first lens;
   a second eyecup comprising a second lens, wherein the first eyecup and the second eyecup are movable relative to each other over a distance of up to about 10 mm to adjust for an interpupillary distance of a user's eyes;
   a single near-eye display screen configured for displaying an image to the user through the first eyecup and the second eyecup;
   at least one processor configured for rendering the image for display on the single near-eye display screen; and
   an enclosure over the single near-eye display screen, the enclosure comprising:
      a first transparent component positioned between the first lens and the single near-eye display screen; and
      a second transparent component positioned between the second lens and the single near-eye display screen, wherein the first transparent component and the second transparent component are stationary relative to the single near-eye display screen.

\* \* \* \* \*